(12) United States Patent
Stephenson et al.

(10) Patent No.: US 7,728,306 B2
(45) Date of Patent: Jun. 1, 2010

(54) NEUTRON LOGGING TOOL HAVING SOURCE AND TARGET WITH DEUTERIUM-TRITIUM GAS ADMIXTURE

(75) Inventors: Kenneth E. Stephenson, Belmont, MA (US); John B. Fitzgerald, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 153 days.

(21) Appl. No.: 11/925,213

(22) Filed: Oct. 26, 2007

(65) Prior Publication Data

US 2009/0108210 A1 Apr. 30, 2009

(51) Int. Cl.
*G01T 3/00* (2006.01)
(52) U.S. Cl. ................... 250/391; 250/390.01
(58) Field of Classification Search ............... 250/269.1, 250/269.2, 269.4, 269.8, 256, 391
See application file for complete search history.

(56) References Cited

U.S. PATENT DOCUMENTS

| | | | | |
|---|---|---|---|---|
| 3,775,216 A | * | 11/1973 | Frentrop | 156/293 |
| 4,760,252 A | * | 7/1988 | Albats et al. | 250/390.07 |
| 4,794,792 A | | 1/1989 | Flaum et al. | |
| 5,420,422 A | * | 5/1995 | Loomis | 250/269.4 |
| 2005/0051718 A1 | * | 3/2005 | Ellis et al. | 250/269.4 |

FOREIGN PATENT DOCUMENTS

GB 2429832 3/2007

* cited by examiner

*Primary Examiner*—David P Porta
*Assistant Examiner*—Faye Boosalis
(74) *Attorney, Agent, or Firm*—Kevin P. McEnaney; Darla P. Fonseca; Charlotte Rutherford (57) ABSTRACT

An accelerator-based neutron tool is provided. The tool includes a deuterium-tritium gas mixture such that the tool outputs a desired ratio of 2.45 MeV and 14 MeV neutrons.

21 Claims, 10 Drawing Sheets

NEUTRON LOGGING TOOL HAVING SOURCE AND TARGET WITH DEUTERIUM-TRITIUM GAS ADMIXTURE

BACKGROUND OF THE INVENTION

1. Field of the Invention

This invention relates broadly to the hydrocarbon industry. More particularly, this invention relates to neutron logging tools useful in the exploration of geological formation. The invention has particular application to accelerator-based neutron porosity tools although it is not limited thereto.

2. State of the Art

Figure 1:
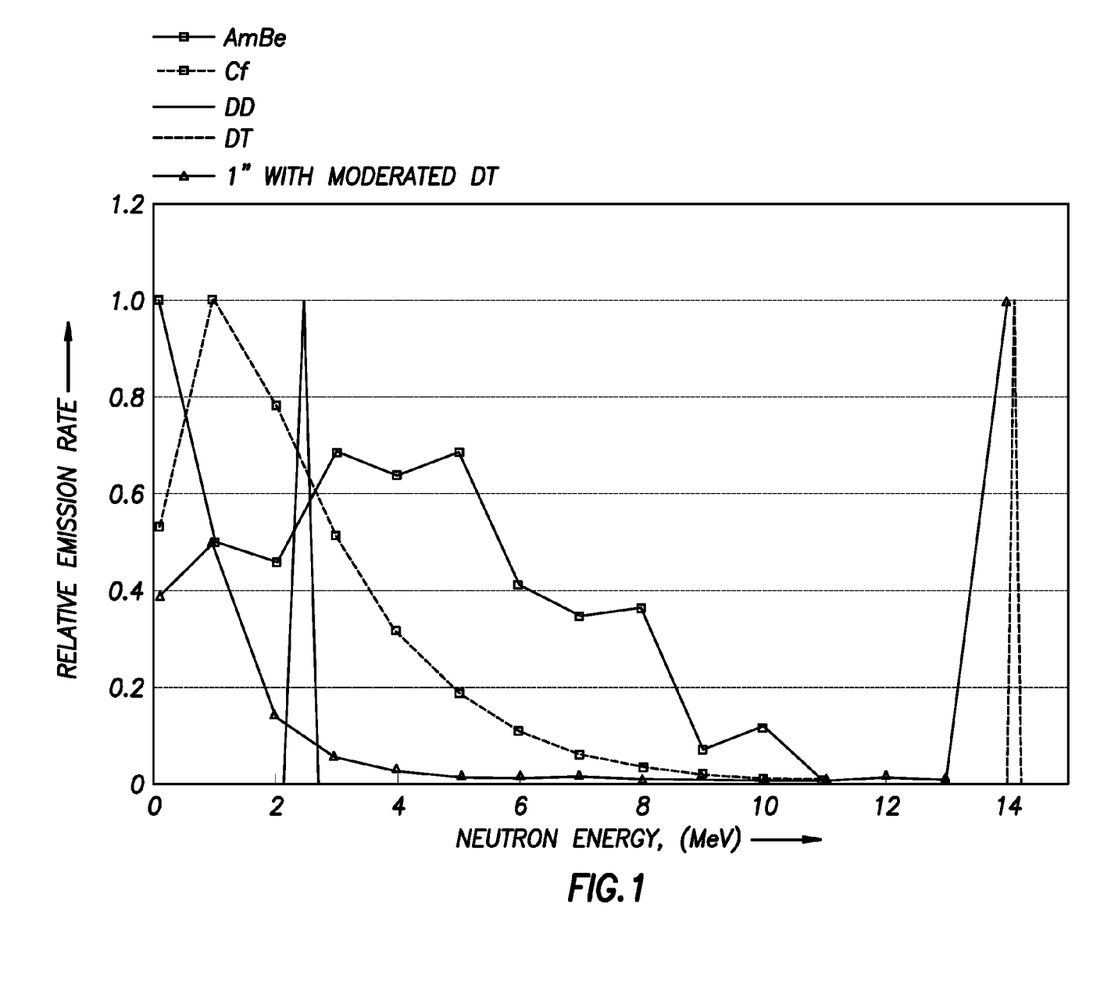
FIG. 1 is a graph showing the relative emission rate at different energies of neutrons generated from an AmBe source, a Cf source, a DD source, a DT source, and a 1" W Moderated DT source.
Figure 2:
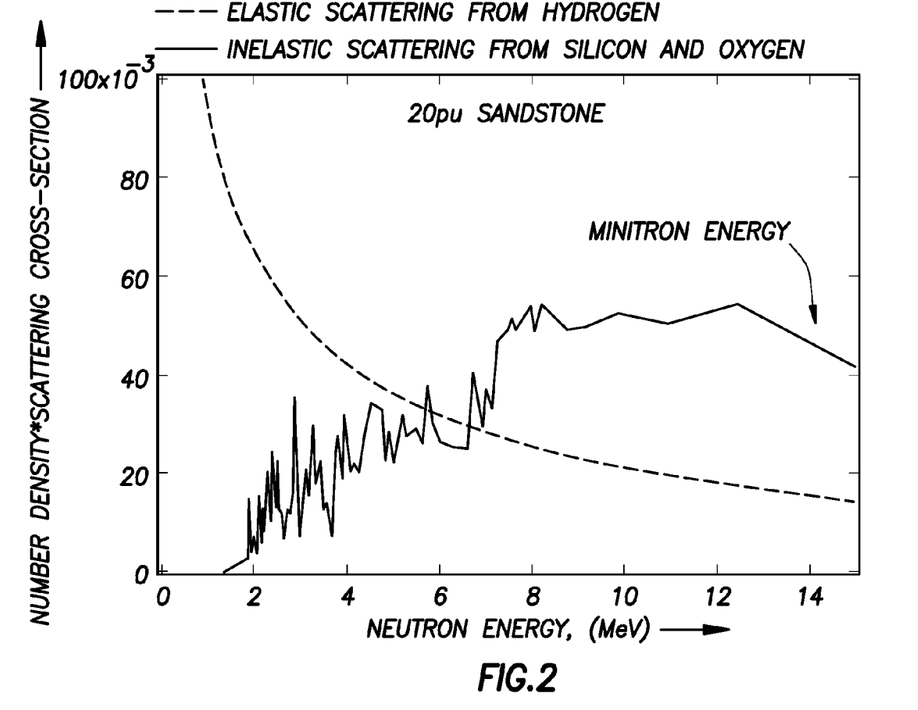
FIG. 2 is a graph showing inelastic scattering and elastic scattering effects in a 20 pu sandstone over a range of neutron energies.

Conventional neutron porosity tools such as the CNT (a trademark of Schlumberger) tool or Compensated Neutron Tool, detect neutrons emitted by a radioisotope-based neutron source after they have traveled through the formation under investigation. The most common neutron source consists of radioactive americium ($^{241}$Am) combined with beryllium, or AmBe. The alpha particles emitted by $^{241}$Am react with beryllium nuclei and emit neutrons of a broad spectrum of energies which span a range of about 11 MeV as seen in FIG. 1. Because of its broad energy spectrum, several different transport processes are involved as neutrons from the AmBe source scatter through the formation and lose energy. As seen in FIG. 27 for neutron energies above about 6 MeV, inelastic scattering is the dominant energy loss mechanism. For neutron energies below about 6 MeV, elastic scattering from hydrogen is the dominant energy loss mechanism. Thus, neutrons emanating from the AmBe source will be subjected to both inelastic scattering and elastic scattering.

Other neutron sources have emission spectra different from the AmBe source. For example, as seen in FIG. 1, a radioactive californium source has a peak at about 1 MeV, and emits few neutrons above 6 MeV. Accelerator-based neutron generators such as DD (deuterium source-deuterium target) and DT (mixed deuterium/tritium source and target, which is typically provided with 50% deuterium and 50% tritium, and the overwhelming interaction is deuterium-tritium) typically emit neutrons at a single energy. For example, the DD neutron generator typically emits 2.45 MeV neutrons, while the DT neutron generator typically emits 14 MeV neutrons. DT sources surrounded by a inch shell of tungsten (1 inch W Moderated DT) have spectra that show neutron emissions in a 0-2 MeV window and a 13-14 MeV window (as seen in FIG. 1). As a result, the neutrons from californium and DD neutron sources are generally subject to primarily elastic scattering, while the neutrons from DT and 1 inch W Moderated DT are subject to both inelastic and elastic scattering. It is noted that the neutrons from DT are subject to elastic scattering after the energies of the neutrons are first reduced by inelastic scattering.

For certain measurements such as formation porosity, tools which utilize an AmBe source and two detectors have been dominant in the marketplace. However, because of security issues associated with radioactive materials, it is no longer desirable to use AmBe as a source material.

SUMMARY OF THE INVENTION

An accelerator-based neutron source generator and a tool incorporating the generator are provided. In one embodiment, the generator source is a grounded target tube having a deuterium-tritium gas mixture which provides a desired ratio of 2.45 MeV and 14 MeV neutrons. According to one embodiment of the invention, the generator target is located at a distance of approximately 22 cm from a near He-3 detector and approximately 41.5 cm from a far He-3 detector and the generator target is separated from the detectors by a hydrogen-containing neutron moderator. According to another embodiment of the invention, the generator target is located at a distance of approximately 33 cm from a near He-3 detector and approximately 52.5 cm from a far He-3 detector, and the generator target is separated from the detectors by a tungsten neutron multiplier/deflector.

According to one embodiment of the invention, the desired ratio of 2.45 MeV to 14 MeV neutrons output by the neutron source is between 3:1 and 5:1, and most preferably 4:1.

According to another embodiment of the invention, the neutron source is adapted to generate approximately $1 \times 10^7 \pm 25\%$ neutrons/second.

According to another embodiment of the invention, the mix of deuterium and tritium in the neutron source generator is 99.72%±0.07% deuterium and 0.28%±0.07% tritium.

According to a further embodiment of the invention, prior to using a logging tool incorporating the desired deuterium-tritium mixture of the invention a calibration measurement is made.

According to another embodiment of the invention, prior to using a logging tool incorporating the desired deuterium-tritium mixture of the invention, a database identifying the tool is interrogated for purposes of making an age-related correction.

According to one aspect of the invention, the tool of the invention incorporating a source generator having a desired deuterium-tritium mixture behaves in a manner similar to a tool utilizing an AmBe source so that detected results of formation response can be interpreted in the same manner as they would otherwise be interpreted for an AmBe source tool and will provide a water-filled porosity (pu) determination within 0.6 pu over an entire porosity range, and less than 0.3 pu over the 0 to 50 pu range.

According to another embodiment of the invention, an AmBe source tool is retrofitted by removing the AmBe source and replacing the AmBe source with a neutron generator having a grounded target tube having a deuterium-tritium gas mixture which provides a desired ratio of 2.45 MeV and 14 MeV neutrons.

Advantages of the invention will become apparent to those skilled in the art upon reference to the detailed description taken in conjunction with the provided figures.

DETAILED DESCRIPTION OF THE PREFERRED EMBODIMENTS

Figure 3:
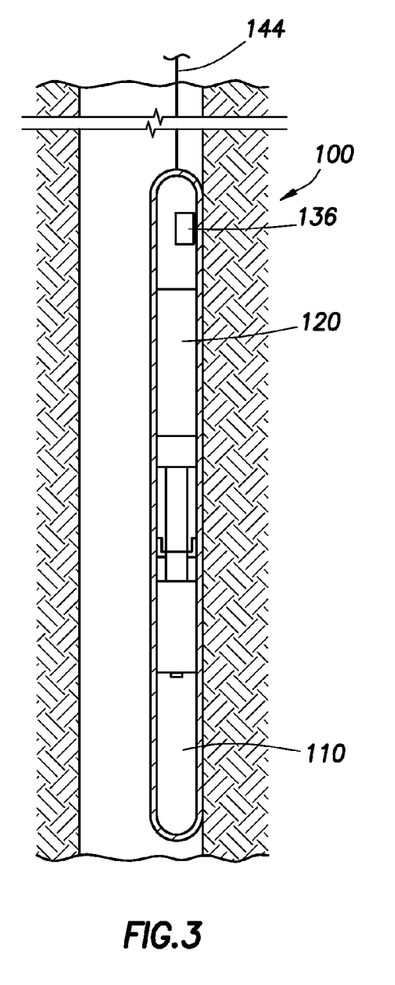
FIG. 3 is a schematic diagram of a first embodiment of a neutron generator tool.

Turning now to FIG. 3, a schematic diagram of a first embodiment of a logging tool 100 is seen. The first embodiment will be described in the context and environment of a process and apparatus for logging a geological formation 10 traversed by a borehole 12. The logging tool (apparatus or sonde) 100 comprises a pressure housing enclosing a neutron source (generator) 110, a first neutron detector 118 (optionally surrounded by an aluminium sleeve 119), and a second neutron detector 120, both spaced from the neutron source. A tungsten neutron multiplier/deflector 122 is located between the neutron generator 110 and the detectors. Other than the neutron source and multiplier/deflector, the logging tool 100 is substantially as shown and described in U.S. Pat. No. 4,794,792 to Flaum which is hereby incorporated by reference in its entirety herein. Thus, in the embodiment of FIG. 3, the first detector 118 is spaced from the neutron generator by approximately 33.0 cm (±1 cm), while the second detector 120 is spaced from the neutron generator by approximately 52.5 cm (±2 cm). Neutron detectors 118 and 120 are preferably of the $He^3$ type. These are gas filled counting tubes filled with $He^3$ gas under pressure. The $He^3$ detectors respond to neutrons scattered back to the detectors from the surrounding earth formations. Preferably, both of the detectors are arranged as thermal neutron detectors. The designs of detectors 118 and 120 are well known and are not an aspect of the present invention so that further description will be omitted for the sake of brevity.

When used in a borehole, voltage pulses from the neutron detectors 118 and 120 typically are amplified by amplifiers (not shown), temporarily stored in buffers (also not shown), and subsequently delivered to the surface through appropriate telemetry circuitry 136 through the wireline 144 from which the tool 100 is suspended. At the surface, the telemetered data is received by suitable telemetry circuitry (not shown) and provided logging computer (not shown) for further processing. Again, all of this is conventional in the art an omitted for the sake of brevity.

The neutron source generator 110 of FIG. 3 is preferably a grounded target, floating ion source neutron tube such as shown in GB2429832A which is hereby incorporated by reference herein in its entirety except that the gas source is a carefully controlled mix of deuterium and tritium with 99.72%±0.07% deuterium and 0.28%±0.07% tritium as will be described in detail hereinafter. With the controlled mix, a desired ratio (of between 3:1 and 5:1) of 2.45 MeV neutrons and 14 MeV neutrons is generated by the grounded target, floating ion source neutron tube, as will be discussed in more detail hereinafter.

Figure 3A:
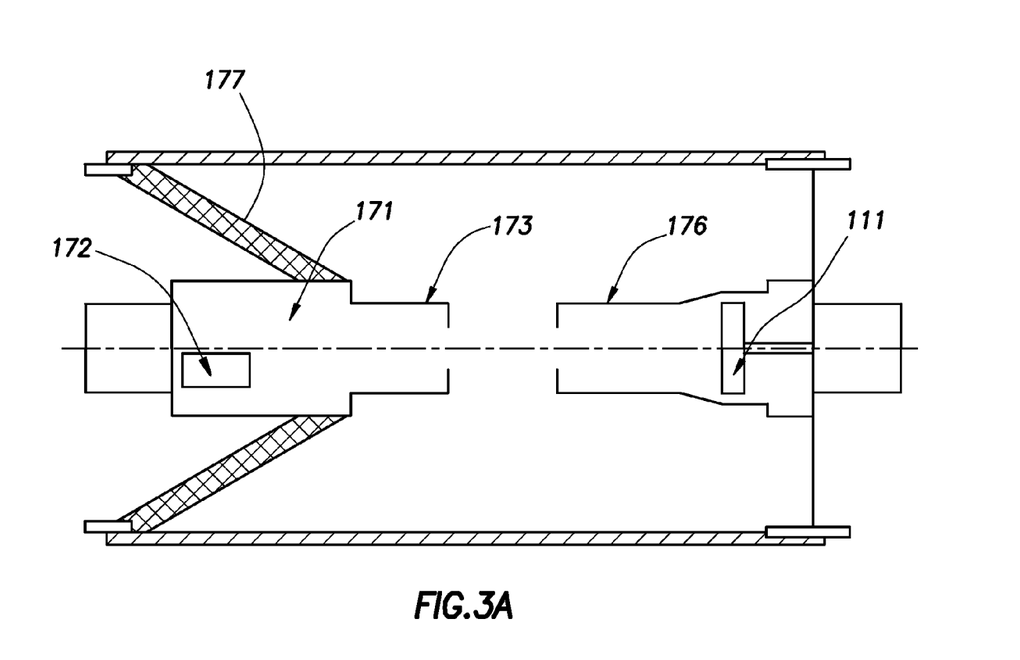
FIG. 3A is a schematic diagram of grounded target, floating ion source neutron tube useful as a neutron source generator.

More particularly, and as seen in FIG. 3A, the preferred neutron source generator 110 generally includes an ion source 171 with a D-T pressure managing device 172 and attached electrode 173, a high voltage insulator 177, a secondary electron suppressor 176 and a grounded target electrode 111. The neutron source generator 110 is preferably capable of generating at least $0.5 \times 10^7$ neutrons/second, and more preferably of generating at least $1 \times 10^7$ neutrons/second (which is expected to permit approximately the same logging speed as a standard AmBe source tool). As will be appreciated by those skilled in the art, higher neutron outputs permit higher logging speeds.

Figure 4:
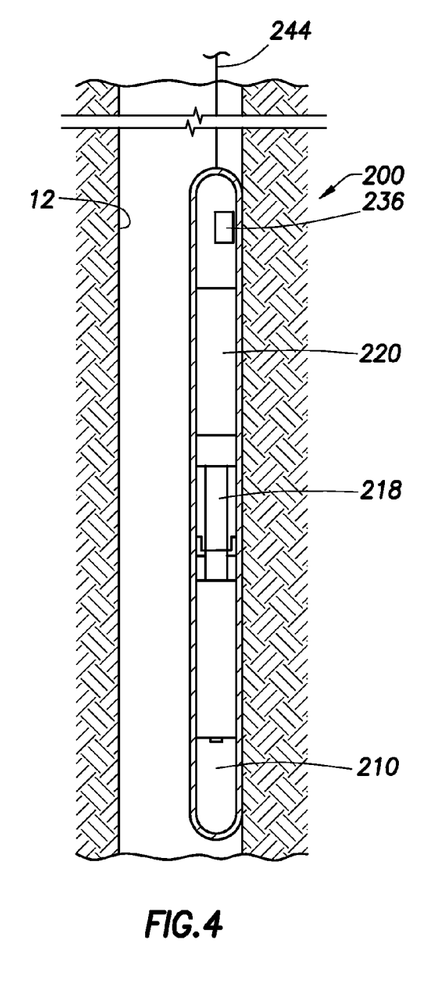
FIG. 4 is a schematic diagram of a second embodiment of a neutron generator tool.

A schematic diagram of a second embodiment of a logging tool 200 is seen in FIG. 4. The second embodiment will be described in the context and environment of a process and apparatus for logging a geological formation 10 traversed by a borehole 12. The logging tool (apparatus or sonde) 200 comprises a pressure housing enclosing a neutron source (generator) 210, a first neutron detector 218, and a second neutron detector 220, both spaced from the neutron source. A hydrogen-containing neutron moderator 221 (e.g., TiH) is located between the neutron generator 210 and the detectors. Other than the neutron source and the neutron moderator, the logging tool 200 is substantially as shown and described in U.S. Pat. No. 4,794,792 to Flaum which is hereby incorporated by reference in its entirety herein. In the embodiment of FIG. 4, the first detector 218 is spaced from the neutron generator by approximately 22 cm (±1 cm) while the second detector 220 is spaced from the neutron generator by approximately 41.5 cm (+2 cm). Neutron detectors 218 and 220 are preferably thermal neutron detectors of the $He^3$ type. The designs of detectors 218 and 220 are well known and are not an aspect of the present invention so that further description will be omitted for the sake of brevity.

When used in a borehole, voltage pulses from the neutron detectors 218 and 220 typically are amplified by amplifiers (not shown), temporarily stored in buffers (also not shown), and subsequently delivered to the surface through appropriate telemetry circuitry 236 through the wireline 244 from which the tool 200 is suspended. At the surface, the telemetered data is received by suitable telemetry circuitry (not shown) and provided logging computer (not shown) for further processing. Again, all of this is conventional in the art an omitted for the sake of brevity.

The neutron source generator 210 of FIG. 4 is preferably a neutron generator such as described above with reference to FIG. 3A.

Figure 5:
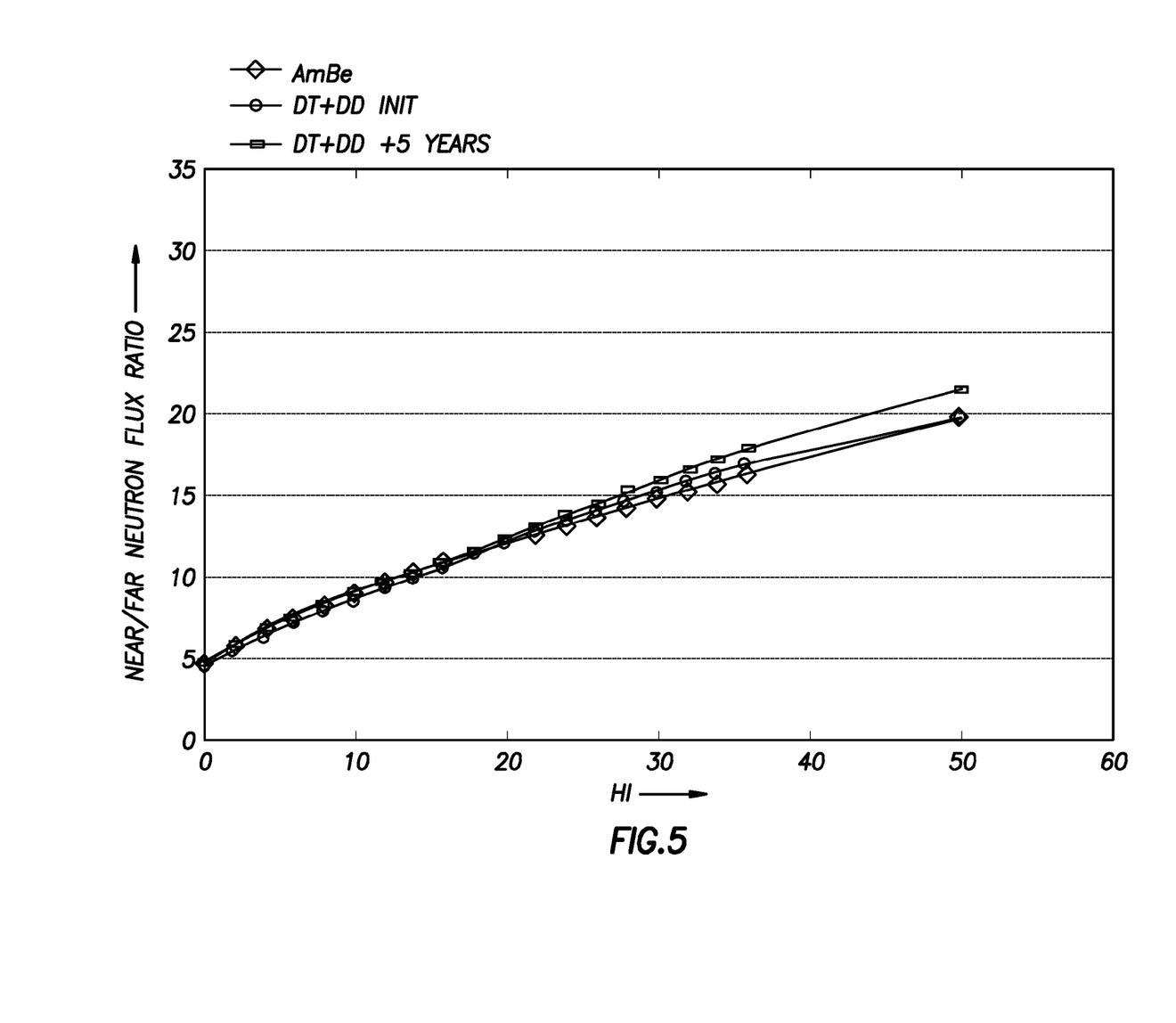
FIG. 5 is a model-generated graph showing the near/far neutron flux ratio as a function of hydrogen index for an AmBe source tool and for a tool such as the tool of FIG. 4 or 5.

By modeling the logging tools 100 and 200 of FIGS. 3 and 4, it has been found that they behave similarly to the CNT-type tools of the prior art which use an AmBe neutron source. For example, the response of a simple two detector tool with a neutron source generator having a deuterium-tritium mixture which provides ten 2.45 MeV neutrons from a deuterium-deuterium reaction for every three 14 MeV neutrons from a deuterium-tritium reaction was calculated for an infinite limestone medium and point detectors located at approximately 38.1 cm and 62.7 cm from the neutron source. The neutron flux f at the detector spaced at distance r from the source can be defined by:

$$f = S_E \frac{e^{-r/L_S}}{r L_S^2} \quad (1)$$

where $L_s$ is the energy-dependent slowing-down length and $S_E$ is the source intensity at energy E. The energy dependent slowing-down lengths are calculated with SNUPAR (See, McKeon, D. C., and Scott, H. D.: "SNUPAR—A Nuclear Parameter Code for Nuclear Geophysics Applications", Nucl. Geophysics Vol. 2, No. 4), and the flux at the near and far detector spacing of the CNT is calculated using equation 1. The ratio of these fluxes for the CNT-type tool and the neutron source generator tool having the deuterium-tritium mixture are plotted in FIG. 5 vs. hydrogen index (HI) for a limestone matrix and it will be appreciated that the responses are very similar. Also plotted in FIG. 5 is the response of the simple two detector tool with a deuterium-tritium mixture which provides ten 2.45 MeV neutrons from a deuterium-deuterium reaction for every three 14 MeV neutrons from a deuterium-tritium reaction after five years of tritium decay in the neutron generator tube. The five year tritium decay decreases the 14 MeV component while the 2.45 MeV component (from the deuterium) remains the same. It is seen that after five years, if no calibration or correction were to be applied, an up to two pu error would occur where the hydrogen index is over 20.

Figure 6:
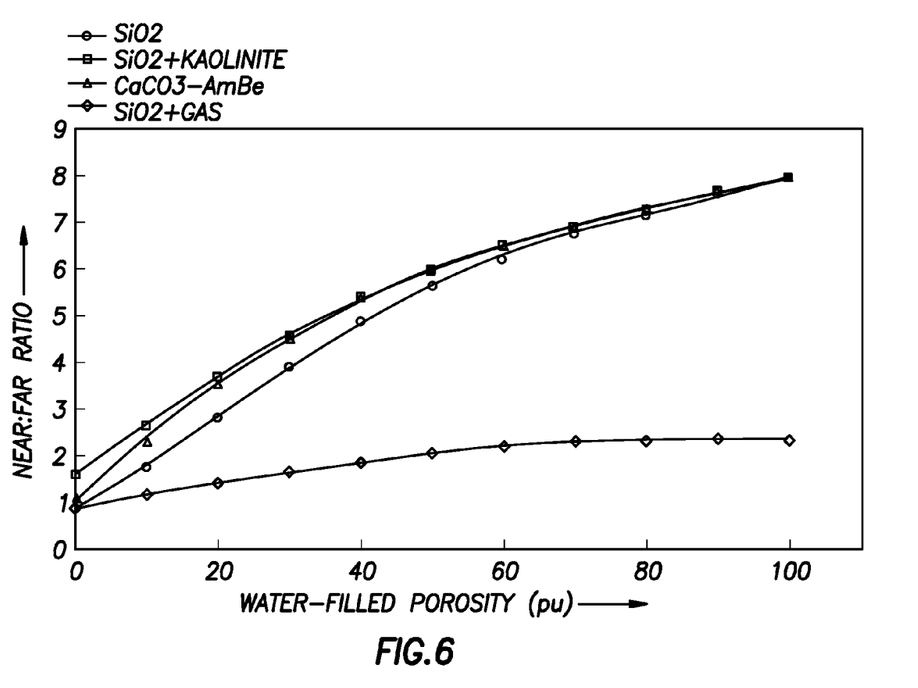
FIG. 6 is a model-generated graph showing the near-far ratio for an AmBe based model for different formation geologies.

Compared to the calculations using the slowing down length $L_s$, a much more accurate simulation can be achieved using MCNP Monte Carlo modeling. Using a model of a standard AmBe-based tool on the bottom of a water-filled borehole (which is identical to the tool of FIG. 4 except that an AmBe source is used instead of the neutron source generator), the model-generated graph of FIG. 6 was generated. FIG. 6 shows the near-far ratio versus water-filled porosity for an AmBe-based tool for different formation geologies.

Figure 7A:
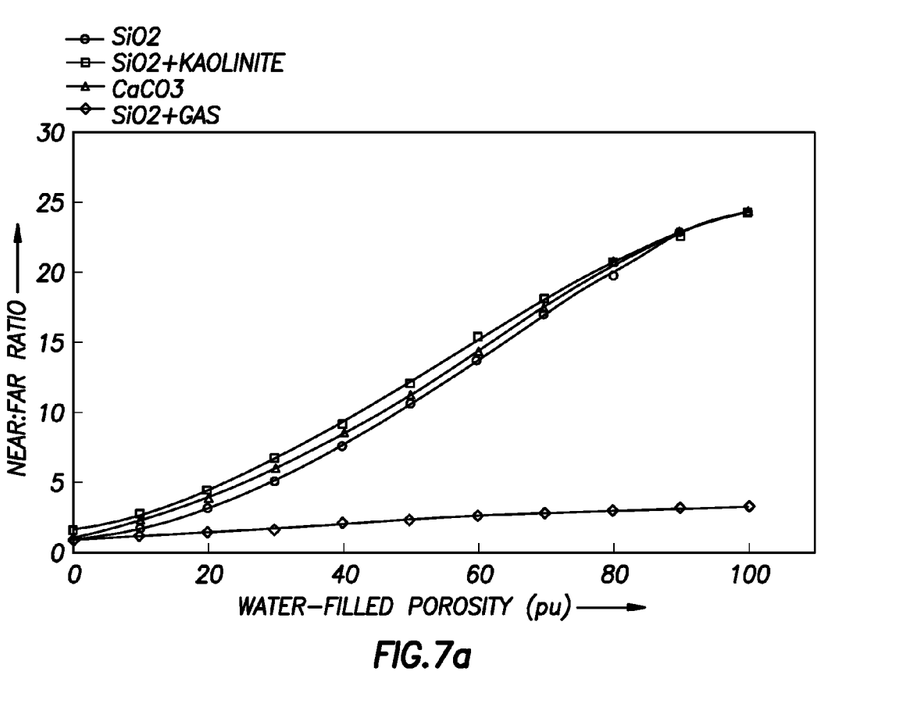
FIGS. 7a-7c are model-generated graphs of the near-far ratio versus water-filled porosity for the tool of FIG. 3 where the neutron source generator utilizes a deuterium-deuterium (DD) system, a deuterium-tritium (DT) system and a mixed DD-DT system respectively.
Figure 7B:
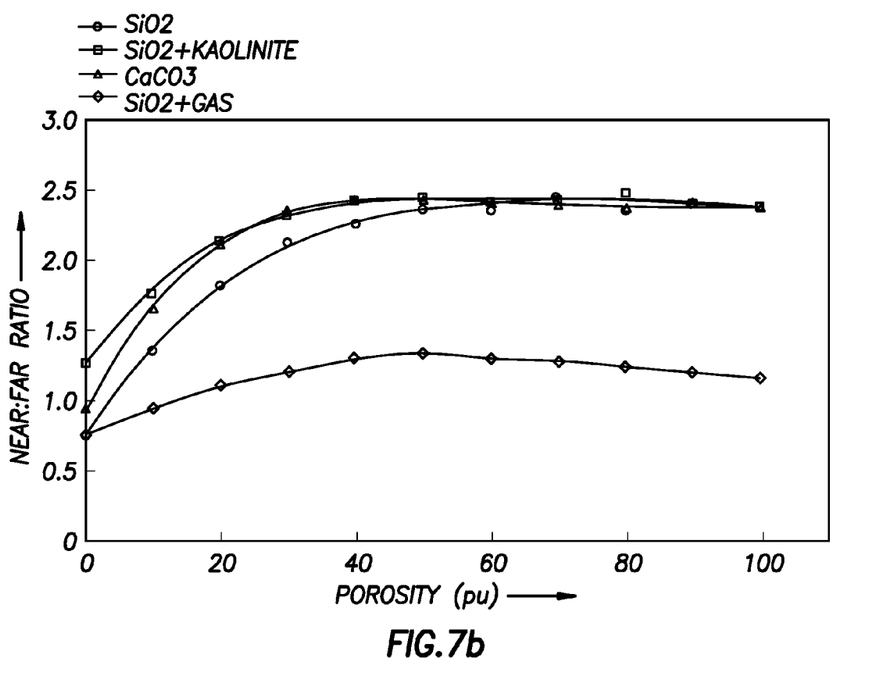
Figure 7C:
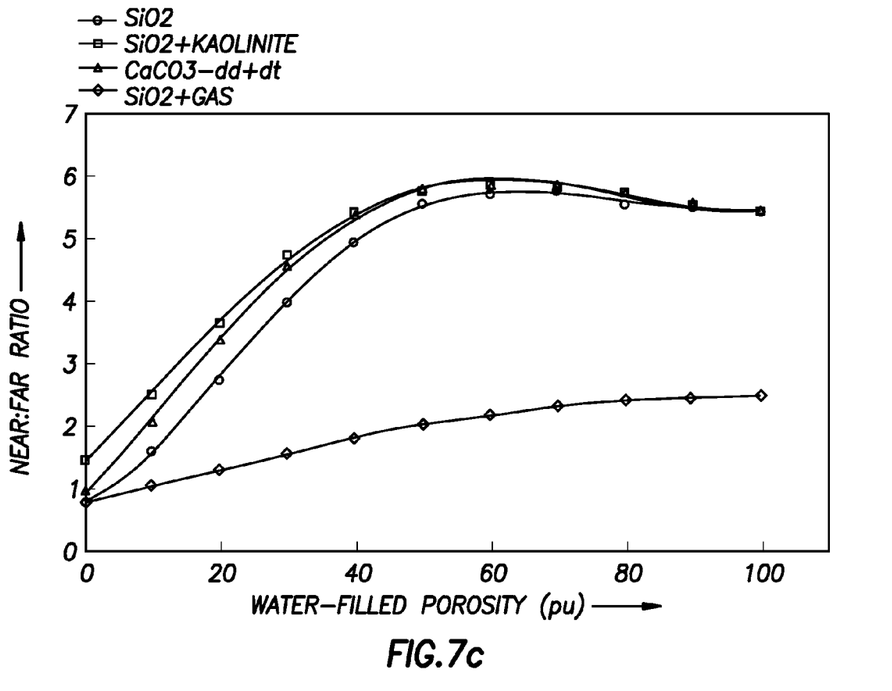

FIGS. 7a-7c are model-generated graphs of the near-far ratio versus water-filled porosity for the tool of FIG. 3 where the neutron source generator respectively utilizes a system (100% deuterium) generating only deuterium-deuterium (DD) reactions (2.45 MeV neutron energies only), a system (typically 50% deuterium-50% tritium) generating substantially only deuterium-tritium (DT) reactions (14 MeV neutron energies) and a system (described hereinafter as having over 99% deuterium and less than 1% tritium—hereinafter referred to as a combination DD-DT generator system) generating both deuterium-deuterium and deuterium-tritium reactions in desired amounts. In the case of FIG. 7c, the DD-DT system is modeled to generate fifteen 2.45 MeV neutrons per two 14 MeV neutrons; (i.e., the 7.5:1 ratio showing a best fit). As will be appreciated by those skilled in the art, the response of the DD system seen in FIG. 7a does not match well to the response of the AmBe source (FIG. 6) as the shape of the curves are very different particularly at low hydrogen index values, and the near-far ratio amplitudes are significantly different above 40 pu. Similarly, the response of the DT system seen in FIG. 7b does not match well to the response of the AmBe source as the shape of the curves are very different particularly at higher hydrogen index values (i.e., at high hydrogen index values, there is little sensitivity of the near/far ratio to hydrogen index, leading to a loss in precision), and the near-far ratio amplitudes are significantly different above 20 pu. On the other hand, the response of the combination (DD-DT) generator system of FIG. 7c appears to match the AmBe source response better, at least up to about 50 pu.

Figure 8:
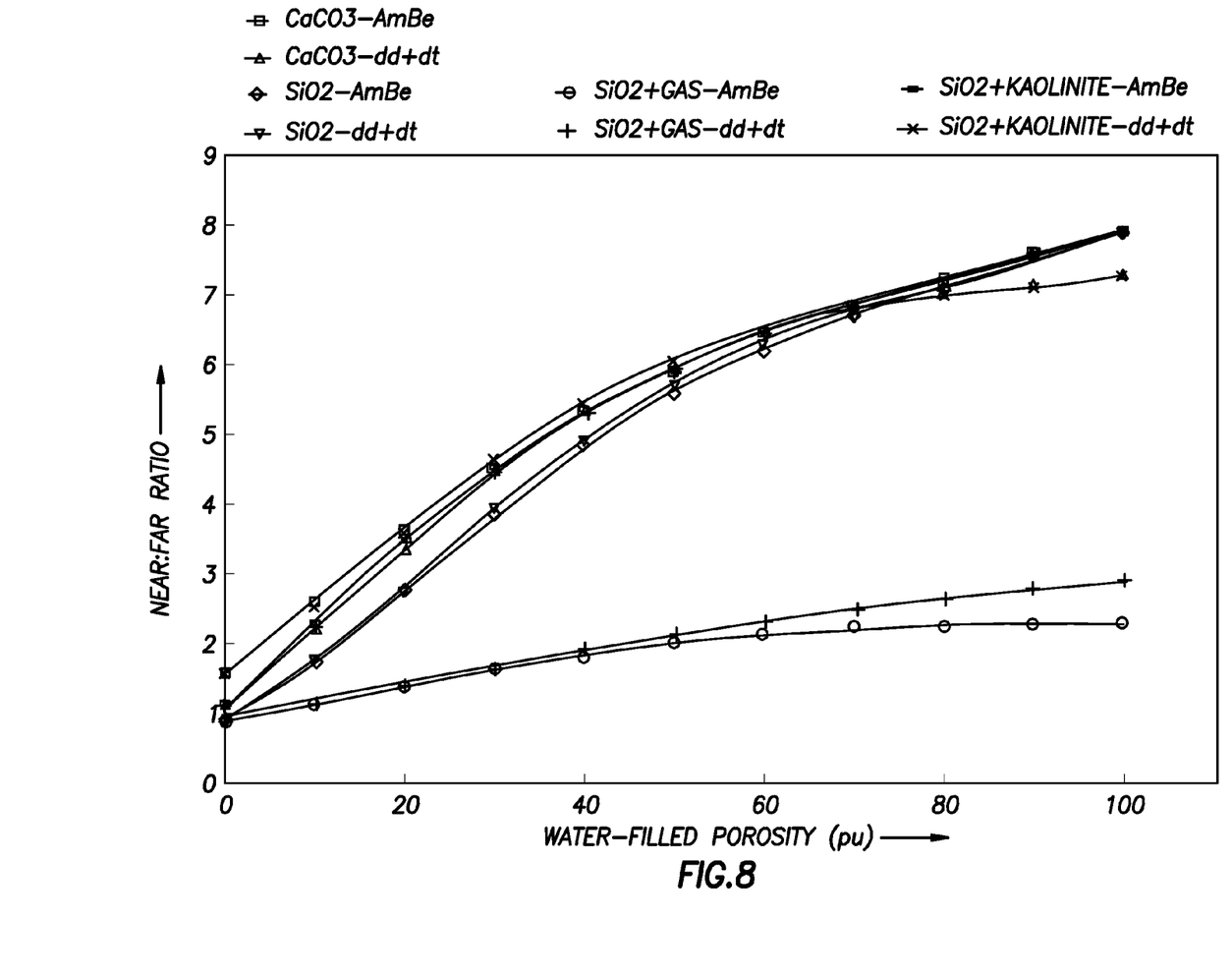
FIG. 8 is a model-generated graph comparing the near-far ratio of the AmBe source tool and the tool source arrangement of FIG. 4 for a mixed DD-DT tool.

When the detectors were moved closer to the source, as in the arrangement of the embodiment of the tool 200 of FIG. 4, the near/far ratio to porosity response of the combination DD-DT generator system matched the AmBe tool response very closely (here a ratio of four 2.45 MeV neutrons for each 14 MeV neutron was chosen as a best fit to the AmBe tool response). In particular, as seen in the model-generated graph of FIG. 8, the response of an AmBe source tool and the tool source arrangement of FIG. 4 for the combination DD-DT tool for formations of calcium-carbonate, silicon-dioxide, and silicon-dioxide plus gas, provided a very close match up to 80 pu. The match for silicon-dioxide plus kaolinite from zero to 50 pu is also extremely close, and then there appears to be some divergence. Given these results, the embodiment of FIG. 4 is presently preferred relative to the embodiment of FIG. 3, although both provide good results and may be utilized.

Figure 9:
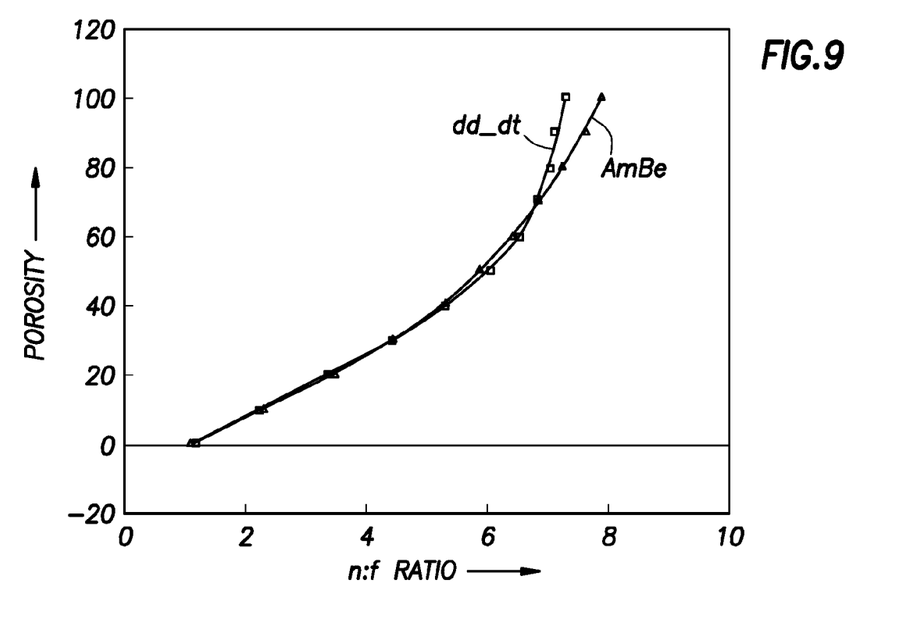
FIG. 9 is a model-generated graph of the near-far ratio versus porosity for an AmBe source tool and for the tool of FIG. 4 (mixed DD-DT source).

To obtain porosity from measured near/far ratios, porosity is expressed as a function of the near/far (n:f) ratio and fit with a function φ(n:f). Any convenient function can be used, but a fourth-order polynomial is found to fit the AmBe data; e.g., φ(n/f)=−10.52+10.47(n/f)−0.902 (n/f)^2+0.079(n/f)^3+0.012 (n/f)^4). Two third-order polynomials (one for 0-50 pu and the other for 50-100 pu) were generated for the tool of FIG. 4; e.g., for 0<φ<=50 pu, φ(n/f)=−14.66+14.58(n/f)−2.07(n/f)^2+0.237(n/f)^3; and for 50<φ<=100 pu, φ(n/f)=−983+584(n/f)−110(n/f)^2+6.92(n/f)^3. FIG. 9 is a model-generated graph of the near-far ratio versus porosity for an AmBe source tool and for the tool of FIG. 4 (combination DD-DT source generator). It is noted that as the curve tends towards the vertical, the sensitivity to porosity decreases.

Figure 10:
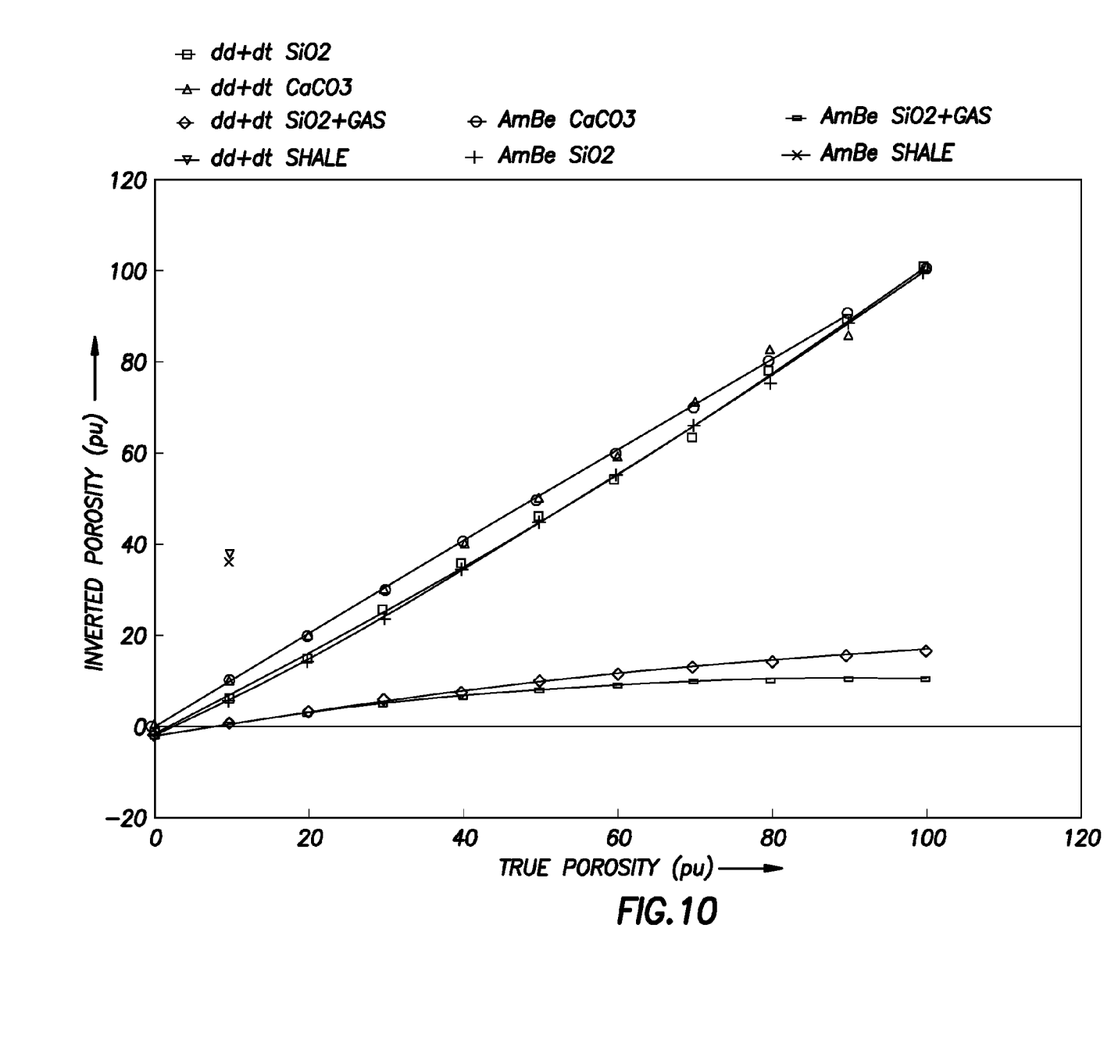
FIG. 10 is a model-generated graphs of true porosity versus inverted porosity in various formation geologies for an AmBe source and the tool source arrangement of FIG. 4 with a mixed DD-DT source.

Turning now to FIG. 10, model-generated graphs of true porosity versus inverted porosity in various formation geologies (assuming an eight inch fresh water borehole, no standoff) for an AmBe source and the tool source arrangement of FIG. 4 with a combination DD-DT source generator (four 2.45 MeV neutrons for every one 14 MeV neutron) are seen. As will be appreciated, the results for shale, $SiO_2$, and calcium carbonate show that the arrangement of the tool of FIG. 4 using a combination DD-DT source generator closely tracks the results of a tool using an AmBe source. The same is true for $SiO_2$ plus gas up to about 50 pu, and then there appears to be some divergence.

Figure 11:
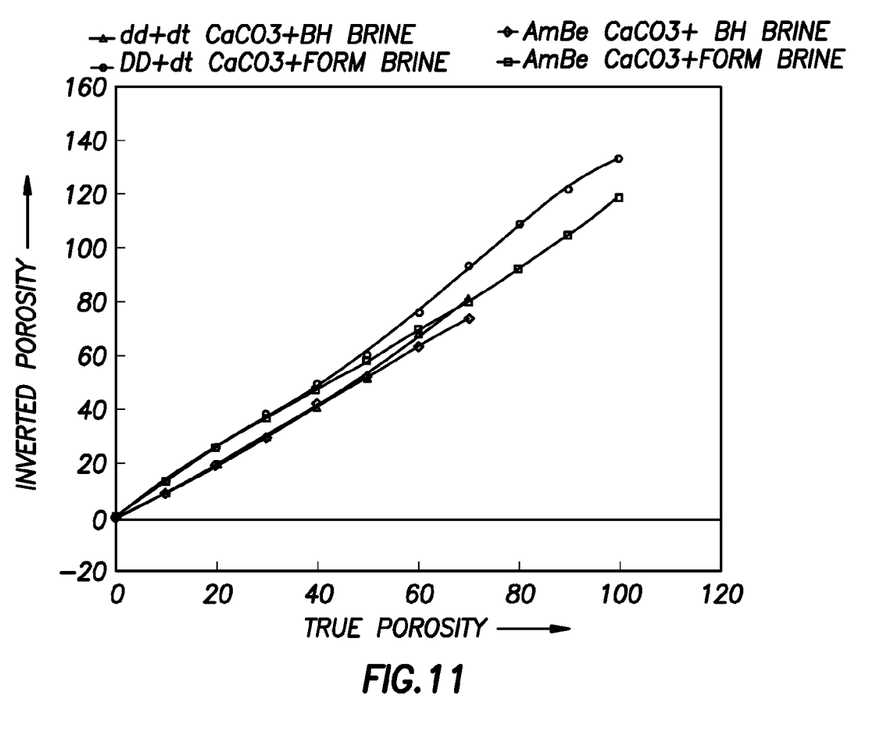
FIG. 11 is a model-generated graphs of true porosity versus inverted porosity in a CaCO3 formation with boreholes of different salinities for an AmBe source and the tool source arrangement of FIG. 4 with a mixed DD-DT source.
Figure 12:
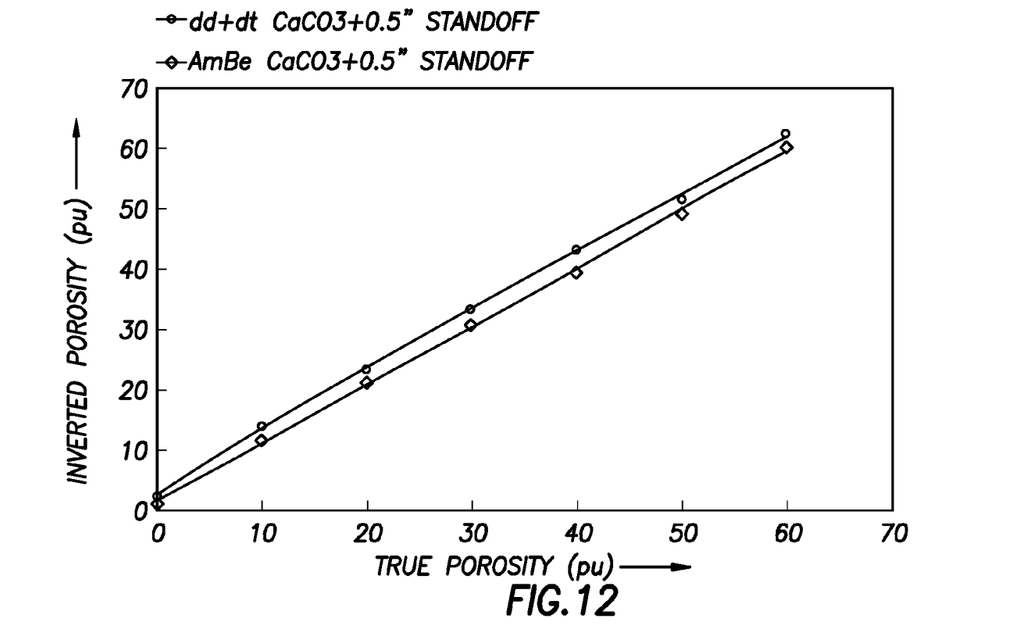
FIG. 12 is a model-generated graphs of true porosity versus inverted porosity in a CaCO3 formation with a different borehole standoff for an AmBe source and the tool source arrangement of FIG. 4 with a mixed DD-DT source.
Figure 13:
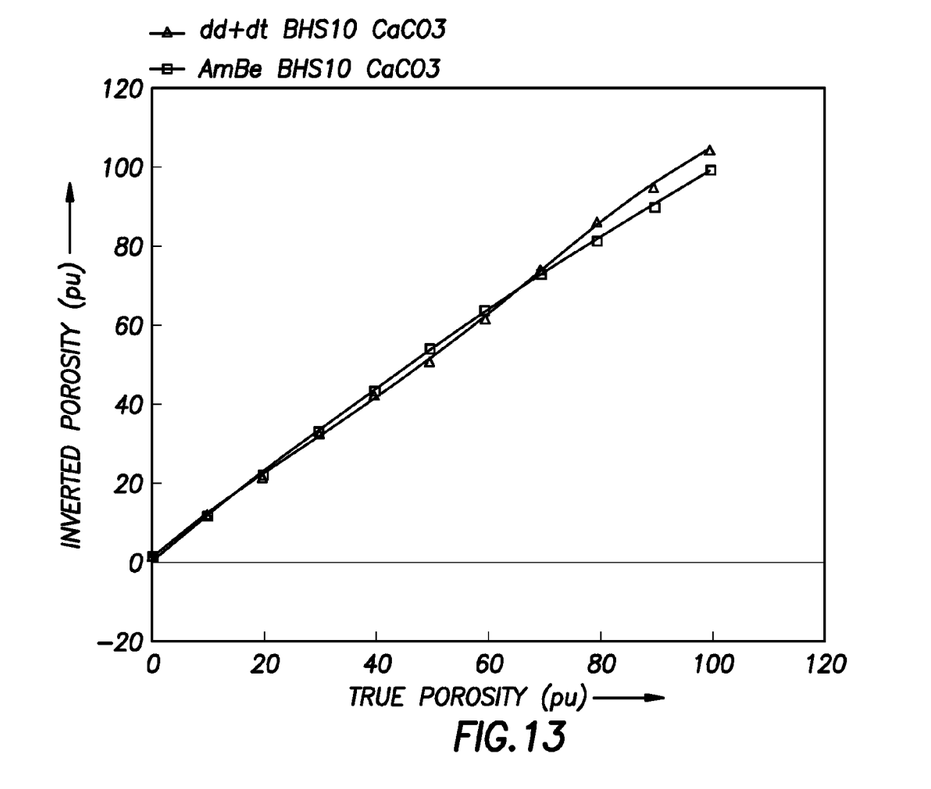
FIG. 13 is a model-generated graphs of true porosity versus inverted porosity in a CaCO3 formation with a different borehole size for an AmBe source and the tool source arrangement of FIG. 4 with a mixed DD-DT source.

FIGS. 11-13 respectively show the effects of salinity, borehole standoff, and borehole size on the tool response of the arrangement of FIG. 4 with the combination DD-DT source generator (four 2.45 MeV neutrons for every one 14 MeV neutron) versus the AmBe tool response for a $CaCO_3$ formation. As seen in FIG. 11, where inverted porosity is plotted against true porosity for a $CaCO_3$ formation having brine in the borehole and a $CaCO_3$ formation with brine in the borehole and formation, salinity does not appear to have much of an effect at porosities up to about 50 pu. Since this range covers most situations encountered in the field, the divergence at higher porosities is not of major concern. However, at the higher porosities, the tool of FIG. 4 with a combination DD-DT source generator will require a larger correction than the AmBe tool.

FIG. 12 indicates that standoff does have a small effect on the tool of FIG. 4 relative to an AmBe tool at all porosities. However, because the effect is small at all porosities, it can be either ignored or included in the environmental corrections FIG. 13 indicates that borehole size has very little affect on the tool of FIG. 4 relative to an AmBe tool at porosities up to 80 pu. Again, since this range covers almost all situations encountered in the field, the small divergence at the extremely high porosities is not of concern.

As previously indicated, the tool response of the tool 200 of FIG. 4 closely matches the tool response of the prior art AmBe tool, particularly when the combination DD-DT source generator provides four 2.45 MeV neutrons for every one 14 MeV neutron. In fact very acceptable results are obtained when the combination DD-DT source generator provides between three and five 2.45 MeV neutrons for every one 14 MeV neutron. Because the neutron source 210 of tool 200 is positioned close to the detectors (e.g., which are approximately 22 cm and 41.5 cm away from the source target), the neutrons emitted by the source are approximately 4.5 more likely to be detected than in the AmBe tool configuration or with a grounded source neutron generator. Since the nominal AmBe source strength is approximately $4.7 \times 10^7$ neutrons/second, a neutron generator output of slightly over $1 \times 10^7$ can achieve the precision of an AmBe-based neutron porosity tool, with between approximately 75% and 83% of neutrons generated from the deuterium-deuterium reaction and 17% to 25% of neutrons generated from the deuterium-tritium reaction. The grounded target tube arrangement is particularly suited for such a neutron output.

The deuterium-tritium gas admixture required to provide a desired ratio of 2.45 MeV neutrons and 14 MeV neutrons can be calculated as follows. If $\alpha$ is defined as the fraction of tritium in the tube, then the probability of a deuteron ion in the beam reacting with a triton target nucleus is proportional to $(1-\alpha)\alpha$. The probability of a deuteron ion in the beam reacting with a deuteron target nucleus is proportional to $(1-\alpha)(1-\alpha)/90$, where the factor 1/90 is taken to be the relative neutron production rate from a deuteron-deuteron reaction relative to a deuteron-triton reaction. Setting the ratio of $(1-\alpha)(1-\alpha)/90$ relative to $(1-\alpha)\alpha$ to four (i.e., four 2.45 MeV neutrons being produced for every one 14 MeV neutron), and solving for a yields $\alpha=1/361$ or approximately 0.28%. When the ratio is set to three, $\alpha-1/271$ or approximately 0.37%. When the ratio is set to five $\alpha=1/451$ or approximately 0.22%. Thus, according to one embodiment of the invention, where a grounded target tube arrangement is utilized and the neutron source is adapted to generate at least $0.5 \times 10^7$ neutrons/second, the mix of deuterium and tritium in the neutron source generator is chosen to be 99.72%±0.07% deuterium and 0.28%±0.07% tritium.

As previously mentioned, tritium decays over time while deuterium is stable. The half-life of tritium is 12.32 years. Thus, if the original activity of tritium is $A_0$ then the remaining activity $A_r$ after y years is $$A_r = A_0^{\frac{y\ln(2)}{12.32}} \quad (2)$$

After one year, the activity of tritium remaining is approximately 95% of the original activity, and therefore, the number of 14 MeV neutrons produced is 95% of the original production. After five years, the number of 14 MeV neutrons produced is approximately 75% of the original production. As the number of 14 MeV neutrons is reduced the overall dynamic range in the near/far ratio as a function of porosity is increased as shown in FIG. 5. Thus, while neutron generator tubes can be produced to have the desired number of 14 MeV neutrons at the time of manufacture, the response of the tool will change over time.

According to one embodiment of the invention, a database of near/far ratios as a function of porosity and as a function of the 2.45 MeV to 14 MeV neutron production ratio for a borehole tool arrangement is produced and stored uphole. In addition, a database of the age of a tool is kept. Since the 2.45 MeV to 14 MeV neutron production ratio is related to the age of the generator (generally according to equation (2)), upon using a tool of the invention, the age of the tool is used to find the current neutron production ratio. The current neutron production ratio is then used to look up in the database a correction needed for the near/far ratio vs. porosity determination. For example, a data base of $\phi(n/f)$ coefficients can be produced as a function of the tritium to deuterium ratio introduced into the neutron tube. Over time the ratio will decrease according to equation (2) above. At any time after the neutron tube is produced, a current set of $\phi(n/f)$ coefficients may be determined by interpolating the database according to the current tritium to deuterium ratio.

According to another embodiment, a database of near/far ratios as a function of porosity and as a function of the 2.45 MeV to 14 MeV neutron production ratio for a borehole tool arrangement is produced and stored in a database. Prior to using a logging tool incorporating the deuterium-tritium source of the invention a calibration measurement is made. For example, a calibration measurement of the near/far ratio is measured at two different porosities (e.g., 100 pu and 33 pu). Then, the database can be interrogated for this combination to determine how much the neutron production ratio has changed and how much of a correction is required to porosity determinations made with the tool. As can be seen in FIG. 5, the deviation of the n/f ratio from 5 years of tritium decay is approximately linearly increasing with porosity (hydrogen index). As is well known, two calibration points are required to determine a linear correction (slope and offset). Accordingly, calibration measurements at e.g., 100 and 33 pu are sufficient to correct the n/f ratio to give essentially the same response as the initial response.

According to one aspect of the invention, the tool of the invention incorporating a deuterium-tritium source is modeled and designed to behave in a manner similar to a tool utilizing an AmBe source so that detected results of formation response can be interpreted in the same manner as they would otherwise be interpreted for an AmBe source tool. Thus, for example, the tool 200 of FIG. 4 is designed with a neutron generator which generates four 2.45 MeV neutrons for every 14 MeV neutron it generates in order to provide a tool response with as good a fit as possible to the tool response of the AmBe tool. However, upon charging of the tool with gas, instead of providing the neutron generator with 0.28% tritium and 99.72% deuterium which would provide the desired ratio of 2.45 MeV and 14 MeV neutrons, the tool is provided an excess of tritium (e.g., a 12.5% excess yielding approximately 0.315% tritium) so that the average deviation from the AmBe response over five years will be within 0.6 pu over an entire porosity range, and less than 0.3 pu over the 0 to 50 pu range.

According to another embodiment of the invention, an AmBe source tool is retrofitted by obtaining the tool, removing the AmBe source, and replacing the AmBe source with a source having a grounded target tube having a deuterium-tritium gas mixture which provides a desired ratio of 2.45 MeV and 14 MeV neutrons.

There have been described and illustrated herein several embodiments of a neutron logging tool methods associated therewith. While particular embodiments of the invention have been described, it is not intended that the invention be limited thereto, as it is intended that the invention be as broad in scope as the art will allow and that the specification be read likewise. Thus, while the invention has been described with reference to a wireline tool, it will be appreciated that the neutron logging tool can be part of a logging-while-drilling LWD tool or other type of tool. Also, while the neutron logging tool of the invention has been described with particular reference to making porosity determinations, it will be appreciated by those skilled in the art that the neutron logging tool can be used for other purposes as well. Further, while a two-detector tool has been described, it will be appreciated that additional detectors could be utilized as well. In addition, while helium-3 type detectors have been disclosed, it will be understood that other types of detectors can be used. Also, while particular source-detector distances have been disclosed as preferred, it will be recognized that the detectors could be located at other distances from the source; i.e., other configurations could be used. By way of one example only, the close detector can be located anywhere between approximately 21 and 34 cm from the source while the far detector can be located anywhere 39.5 and 54.5 cm from the source. Furthermore, while particular ratios (and ranges) for 2.45 MeV and 14 MeV neutrons have been described, it will be understood that depending upon the distances between the source and detectors, other ratios which would provide a closest fit to the AmBe tool response could be used. Thus, for example, for the arrangement of FIG. 3, a 7.5:1 ratio of 2.45 MeV and 14 MeV neutrons might be preferred. Setting the ratio of $(1-\alpha)(1-\alpha)/90$ relative to $(1-\alpha)\alpha$ to 7.5 and solving for $\alpha$ yields $\alpha=1/676$ or a tritium concentration of approximately 0.15%. Based on other factors, according to one embodiment of the invention, that concentration can be varied by ±25%. So, depending upon various factors such as the location of the source relative to the detectors, the spacing of the detectors, etc., the desired ratio of 2.45 MeV and 14 MeV neutrons generated is envisioned to encompass a range of 10:1 to 2:1. It will therefore be appreciated by those skilled in the art that yet other modifications could be made to the provided invention without deviating from its spirit and scope as claimed.

What is claimed is:

1. A tool for use in a borehole traversing a formation, comprising:
    a) a neutron generator including a mixture of deuterium gas and tritium gas selected to generate a desired output ratio of 2.45 MeV to 14 MeV neutrons when said mixture is ionized and accelerated toward a target, said desired ratio being between 10:1 and 2:1;
    b) at least two neutron detectors spaced from said neutron generator.

2. A tool according to claim 1, wherein:
said ratio is between 5:1 and 3:1.

3. A tool according to claim 2, wherein:
said mixture of deuterium and tritium is 99.72%±0.07% deuterium and 0.28%±0.07% tritium.

4. A tool according to claim 1, wherein:
said neutron generator generates at least $0.5 \times 10^7$ neutrons/second.

5. A tool according to claim 4, wherein:
said neutron generator generates at least $1 \times 10^7$ neutrons/second.

6. A tool according to claim 1, wherein:
said neutron generator includes a grounded target tube.

7. A tool according to claim 6, wherein:
said neutron detectors are $He^3$ detectors.

8. A tool according to claim 7, wherein:
a first of said at least two detectors is spaced between 21 cm and 34 cm from said neutron generator, and a second of said at least two detectors is spaced between 39.5 cm and 54.5 cm from said neutron generator.

9. A tool according to claim 8, wherein:
a first of said at least two detectors is spaced 22 cm (±1 cm) from said neutron generator and a second of said at least two detectors is spaced 41.5 cm (±2 cm) from said neutron generator.

10. A tool according to claim 9, further comprising:
a hydrogen-containing neutron moderator located between said neutron generator and said at least two detectors.

11. A tool according to claim 10, wherein:
said neutron moderator comprises TiH.

12. A tool according to claim 8, wherein:
a first of said at least two detectors is spaced 3 cm (±1 cm) from said neutron generator and a second of said at least two detectors is spaced 52.5 cm (±2 cm) from said neutron generator.

13. A tool according to claim 12, further comprising:
a tungsten neutron multiplier/deflector located between said neutron generator and said at least two detectors.

14. A tool according to claim 1, further comprising:
telemetry coupled to said at least two neutron detectors.

15. A method, comprising:
    a) obtaining a tool having a neutron generator and at least two neutron detectors spaced from said neutron generator, said neutron generator including a mixture of deuterium gas and tritium gas selected upon manufacture of said tool to generate a desired output ratio of 2.45 MeV to 14 MeV neutrons when said mixture is ionized and accelerated toward a target, said desired ratio being between 10:1 and 2:1;
    b) identifying the age of said neutron generator of said tool;
    c) using said age to find a current output production ratio of said tool.

16. A method according to claim 15, further comprising:
storing a database of detector neutron detection ratios as a function of porosity and as a function of a plurality of 2.45 MeV to 14 MeV ratios; and
utilizing said current output production ratio to generate a correction for said database.

17. A method according to claim 16, further comprising:
running said tool in a borehole and using said at least two neutron detectors to obtain a near/far ratio; and
finding a porosity of said formation using said near/far ratio and said correction for said database.

18. A method of investigating an earth formation traversed by a borehole, comprising:
    a) locating a tool in a borehole, said tool having a neutron generator and at least two neutron detectors spaced from said neutron generator, said neutron generator including a mixture of deuterium gas and tritium gas selected to generate a desired output ratio of 2.45 MeV to 14 MeV neutrons when said mixture is ionized and accelerated toward a target, said desired ratio being between 10:1 and 2:1;
    b) generating and storing a database of ratios of detected neutrons by neutron detectors as a function of porosity and as a function of 2.45 MeV to 14 MeV neutron production ratios;
    c) calibrating said tool out of the borehole by measuring a ratio of detected neutrons by said at least two neutron detectors in a calibration system of two different known porosities and comparing said ratio of detected neutrons to said database;
    d) based on said calibrating, determining a change in said neutron production ratio of said tool, and using said change, determining a porosity correction required.

19. A method, comprising:
a) obtaining a borehole tool having an AmBe neutron source;
b) removing said AmBe neutron source from said borehole tool;
c) inserting a neutron generator into said tool; and
d) charging said neutron generator with a mixture of deuterium gas and tritium gas selected to generate a desired output ratio of 2.45 MeV to 14 MeV neutrons when said mixture is ionized and accelerated toward a target, said desired ratio being between 10:1 and 2:1.

20. A method according to claim 19, wherein:
said neutron generator comprises a grounded target tube generator, and said inserting comprises locating a target of said neutron generator at a location where said AmBe neutron source was located.

21. A method according to claim 19, wherein:
said ratio is between 5:1 and 3:1, and said mixture of deuterium and tritium is 99.72%±0.07% deuterium and 0.28±0.07% tritium.

* * * * *